United States Patent [19]
Wenger

[11] Patent Number: 5,939,124
[45] Date of Patent: Aug. 17, 1999

[54] METHOD OF EXTRUSION COOKING AN EDIBLE MATERIAL

[75] Inventor: Lavon G. Wenger, Sabetha, Kans.

[73] Assignee: Wenger Manufacturing, Inc., Sabetha, Kans.

[ * ] Notice: This patent is subject to a terminal disclaimer.

[21] Appl. No.: 08/848,817

[22] Filed: May 1, 1997

Related U.S. Application Data

[63] Continuation-in-part of application No. 08/743,561, Nov. 4, 1996, abandoned, which is a continuation-in-part of application No. 08/685,893, Jul. 18, 1996, Pat. No. 5,694,833.

[51] Int. Cl.⁶ .................................. A23K 1/00; A23P 1/00
[52] U.S. Cl. .......................... 426/516; 426/635; 426/656; 426/661
[58] Field of Search ............................... 426/73, 516, 635, 426/549, 656, 661

[56] References Cited

U.S. PATENT DOCUMENTS

| | | | |
|---|---|---|---|
| 3,117,006 | 1/1964 | Wenger | 426/448 |
| 4,118,164 | 10/1978 | Wenger et al. | 425/202 |
| 4,763,569 | 8/1988 | Wenger et al. | 426/451 |
| 5,480,673 | 1/1996 | Rokey | 426/516 |

*Primary Examiner*—George Yeung
*Attorney, Agent, or Firm*—Hovey, Williams, Timmons & Collins

[57] ABSTRACT

Improved short length extrusion cooking devices (10) are provided which can achieve product throughput and quality characteristics of conventional long-barrel extruders. The short length extruders (10) of the invention include a relatively short barrel (14) having an inlet (18) and an endmost extrusion die (20). An elongated, helically flighted axially, rotatable screw assembly (22) is positioned within the barrel (14) and is coupled to motive means (39, 39a) for rotation of the assembly (22) at a speed of at least about 500 rpm. The device (10) may include an internal, apertured flow-restricting device (60, 110) which defines a mid-barrel choke point for the material being processed. An alternate extruder (120) is configured without a mid-barrel restriction and is designed to operate at essentially atmospheric internal pressure throughout the majority of the length of barrel (122) with a significant pressure rise in the final head (134) adjacent the extrusion die. Preferably, the barrel (14, 122) has an internal bore of generally frustoconical configuration with an effective length to maximum diameter ratio (L/D) of at least about 6. Novel extrusion processes and products are also provided, using extremely short extrusion barrel retention times to give cooked extrudates having essentially no amino acid or vitamin nutrient losses, and/or dense, highly cooked, low moisture feeds.

24 Claims, 7 Drawing Sheets

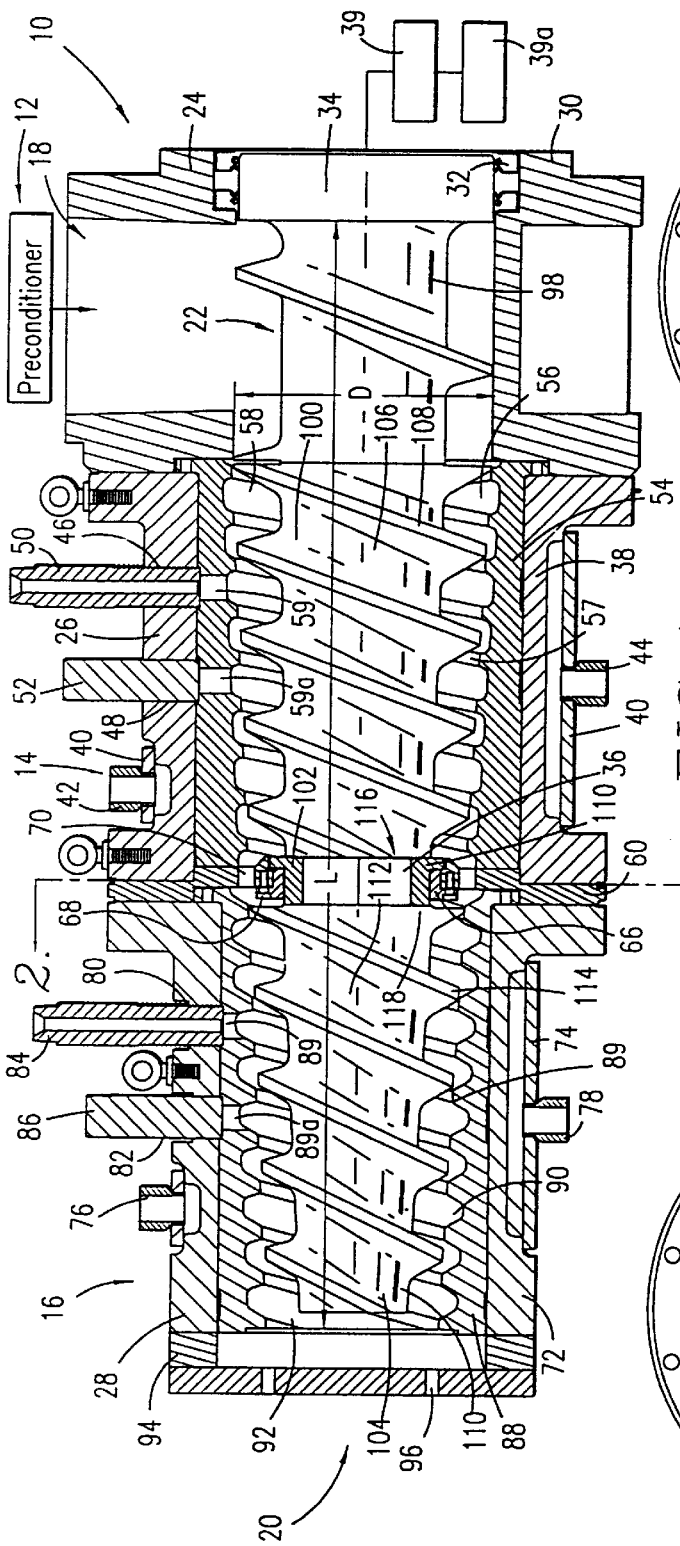
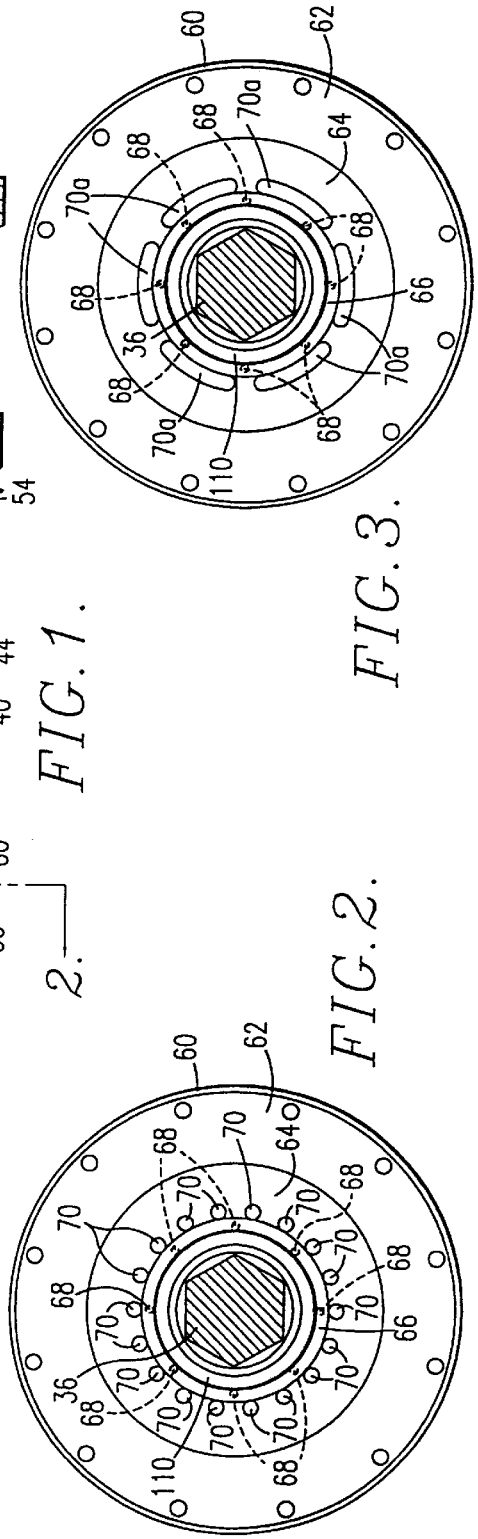
FIG. 1.
FIG. 2.
FIG. 3.

METHOD OF EXTRUSION COOKING AN EDIBLE MATERIAL

RELATED APPLICATION

This is a continuation-in-part of Ser. No. 08/743,561, filed Nov. 4, 1996, now abandoned, which is a continuation-in-part of application Ser. No. 08/685,893, filed Jul. 18, 1996, now U.S. Pat. No. 5,694,833.

BACKGROUND OF THE INVENTION

1. Field of the Invention

The present invention is broadly concerned with an improved extrusion cooking device and method wherein the extruder is of minimal length to reduce equipment and maintenance costs. More particularly, the invention pertains to such a device wherein the internal bore of the extruder barrel is of tapered, generally frustoconical configuration and the extruder screw is correspondingly tapered. In the production of expanded feed products, the extruder preferably includes means presenting a material flow restriction intermediate the inlet and extrusion die. Where dense, fully cooked, low moisture sterilized feeds are desired, the extruder is operated without a mid-barrel flow restriction, and the extruder is operated to generate high pressure within the barrel immediately adjacent the extruder die. Extrusion devices in accordance with the invention are operated at high speed and can essentially match the throughputs and product qualities of much larger machines.

2. Description of the Prior Art

Extrusion cooking devices have long been used in the manufacture of a wide variety of edible and other products such as human and animal feeds. Generally speaking, these types of extruders include an elongated barrel together with one or more internal, helically flighted, axially rotatable extrusion screws therein. The outlet of the extruder barrel is equipped with an apertured extrusion die. In use, a material to be processed is passed into and through the extruder barrel and is subjected to increasing levels of temperature, pressure and shear. As the material emerges from the extruder die, it is fully cooked and shaped and may typically be subdivided using a rotating knife assembly. Conventional extruders of this type are shown in U.S. Pat. Nos. 4,763,569, 4,118,164 and 3,117,006.

Most conventional modem-day extrusion cookers are made up of a series of interconnected tubular barrel heads or sections with the internal flighted screw(s) also being sectionalized and mounted on powered, rotatable shaft(s). In order to achieve the desired level of cook, it has been thought necessary to provide relatively long barrels and associated screws. Thus, many high-output pet food machines may have five to eight barrel sections and have a length of from about 10 to 20 times the screw diameter. As can be appreciated, such long extruders are expensive and moreover present problems associated with properly supporting the extrusion screw(s) within the barrel. However, prior attempts at using relatively short extruders have not met with success, and have been plagued with problems of insufficient cook and/or relatively low yields.

In recent years, attempts have been made to use extrusion equipment in the fabrication of pelleted feeds. Extrusion is desirable in this context because extrusion conditions effectively sterilize the products. However, pellets produced by traditional extrusion methods are often too hard and do not dissolve readily in water. Such hard pellets may pass through the stomach of monogastric animals with the pellets remaining largely intact and non-digested. Another problem associated with extrusion-produced feeds is that nutrients such as amino acids and vitamins may be substantially degraded and heat-denatured during processing. On the other hand, products produced using conventional pellet mills, though having many desirable physical and nutritional properties, are insufficiently heat processed and cooked so that harmful bacteria may remain in the pelleted products. In response to these problems, it has been suggested to employ a dual component apparatus in the form of an extruder (sometimes referred to as an "expander") which is coupled to a pellet mill. The starting materials are thus cooked in the extruder section, and ultimately formed in the attached pellet mill. This dual component apparatus is relatively expensive however, particularly for the production of animal feeds.

There is accordingly a need in the art for improved, low-cost, short length extruder devices which are essentially equal with conventional long-barrel extruders in terms of product throughput and quality. In addition, there is a need for an extruder apparatus which can produce feeds containing substantially non-degraded nutrients which are highly cooked and have desirable digestion properties similar to those of traditional feeds produced using a pellet mill.

SUMMARY OF THE INVENTION

The present overcomes the problems outlined above, and provides a short length cooking extruder and method which yields superior products at commercially viable throughputs using an extruder substantially shorter in length than those of conventional design. Broadly speaking, the extruder of the invention includes the usual tubular barrel having an inlet and an outlet and presenting an inner surface defining an elongated bore. The extruder also includes an elongated, helically flighted screw assembly within the bore, motive means for axially rotating the screw assembly, and an apertured extrusion die disposed across the barrel outlet.

However, a number of important structural features are incorporated into the extruders hereof in order to achieve the ends of the invention. Thus, the internal bore of the barrel is preferably of generally frustoconical configuration for at least about 50% of the length of the barrel between the inlet to the extrusion die and presents a generally decreasing cross-sectional area along the bore length; preferably, the barrel bore is of tapered, frustoconical configuration for substantially the entirety of the barrel length between the inlet and outlet. Moreover, one preferred extruder embodiment includes structure defining a mid-barrel material flow restriction, which is preferably in the form of an apertured flow-restricting device; this generates a mid-barrel die resulting in a choke region of material during operation of the extruder. The screw assembly and flow-restriction are cooperatively designed in this embodiment so that the material displacement per revolution of the screw assembly adjacent the upstream margin of the flow-restriction is less than the material displacement per revolution adjacent the downstream margin of the flow-restriction.

In another embodiment especially designed for the production of dense, highly cooked pelleted feeds, the extruder is designed without a mid-barrel restriction, but is configured so as to generate high pressure conditions in the barrel immediately adjacent the extruder die. In this way, the product is very rapidly cooked and formed without substantial nutrient degradation. In addition, the dense products produced using this embodiment have very desirable water absorption and digestion properties.

The extruder barrels of the invention normally have inner bore-defining surfaces configured to present spaced, helical rib sections along the length thereof, these ribs assist in mixing and cooking of the material during travel along the short length of the extruder barrels. This effect is augmented by the relatively high rotational speeds of the corresponding screw assemblies; in practice, the screw assemblies are rotated at a speed of at least about 500 rpm, more preferably at least about 550 rpm, and even more preferably at least about 600 rpm. The most preferred range of rpm is from about 600–1200.

The short length extruders of the invention have a length to maximum diameter ratio (L/D ratio) of up to about 6, and more preferably from about 3–6. Thus, devices in accordance with the invention can be produced at a significantly lower cost as compared with conventional cooking extruders. Furthermore, maintenance and parts replacement costs are lessened.

The extruders and methods in accordance with the invention are particularly suited for the preparation of feed products, especially animal feed products. Such products may be of the expanded variety, such as typical pet foods, or more dense pellet-type products. The starting materials for expanded or dense feeds usually include a high proportion of grain at a level of at least about 40% by weight (e.g., corn, wheat, soy, milo, oats), and may include fats and other incidental ingredients. Expanded products in accordance with the invention would typically have a final (i.e., after drying) density of from about 15–25 $lb/ft^3$, whereas denser pellet-type products would normally have a final density of from about 30–50 $lb/ft^3$. Broadly, therefore, products of the invention would have final densities in the range of from about 15–50 $lb/ft^3$.

It has also been found that products produced in accordance with the present invention exhibit essentially no loss of amino acid and/or vitamin content, i.e., no more than about a 10% loss as compared with the respective total amino acid and/or vitamin contents of the starting recipes, and most preferably less than 5% loss. Stated differently, the extrudates of the invention should have at least about 90% of the starting total amino acid and/or vitamin content present therein in a substantially nutritionally active and undegraded form, and more preferably at least about 95% thereof. Total amino acids are derived from the amino acids present in the starting ingredients and by the inclusion of amino acid additives. Such additives would include lysine, valine, methionine, arginine, threonine, tryptophan, histadine, isoleucine, and phenylalamine, either as a free amino acid or as residues in more complex additives such as di-, tri- and other polypeptides. The type of vitamins would be dictated by nutritional requirements, and would typically include indigenous vitamins and/or vitamin premixes containing a variety of vitamins including vitamin A. The ability to maintain amino acid and/or vitamin contents is a distinct advantage over conventional processing, wherein amino acid and vitamin degradation during extrusion cooking can be considerable.

BRIEF DESCRIPTION OF THE DRAWINGS

FIG. 1 is a vertical sectional view depicting a preferred short length extruder in accordance with the invention;

FIG. 2 is a sectional view taken along line 2—2 of FIG. 1 and depicting the mid-barrel die assembly of the extruder;

FIG. 3 is a sectional view similar to FIG. 2 but illustrating an alternative mid-barrel die design;

DETAILED DESCRIPTION OF THE PREFERRED EMBODIMENT

Embodiment of FIGS. 1–3

Figure 4:
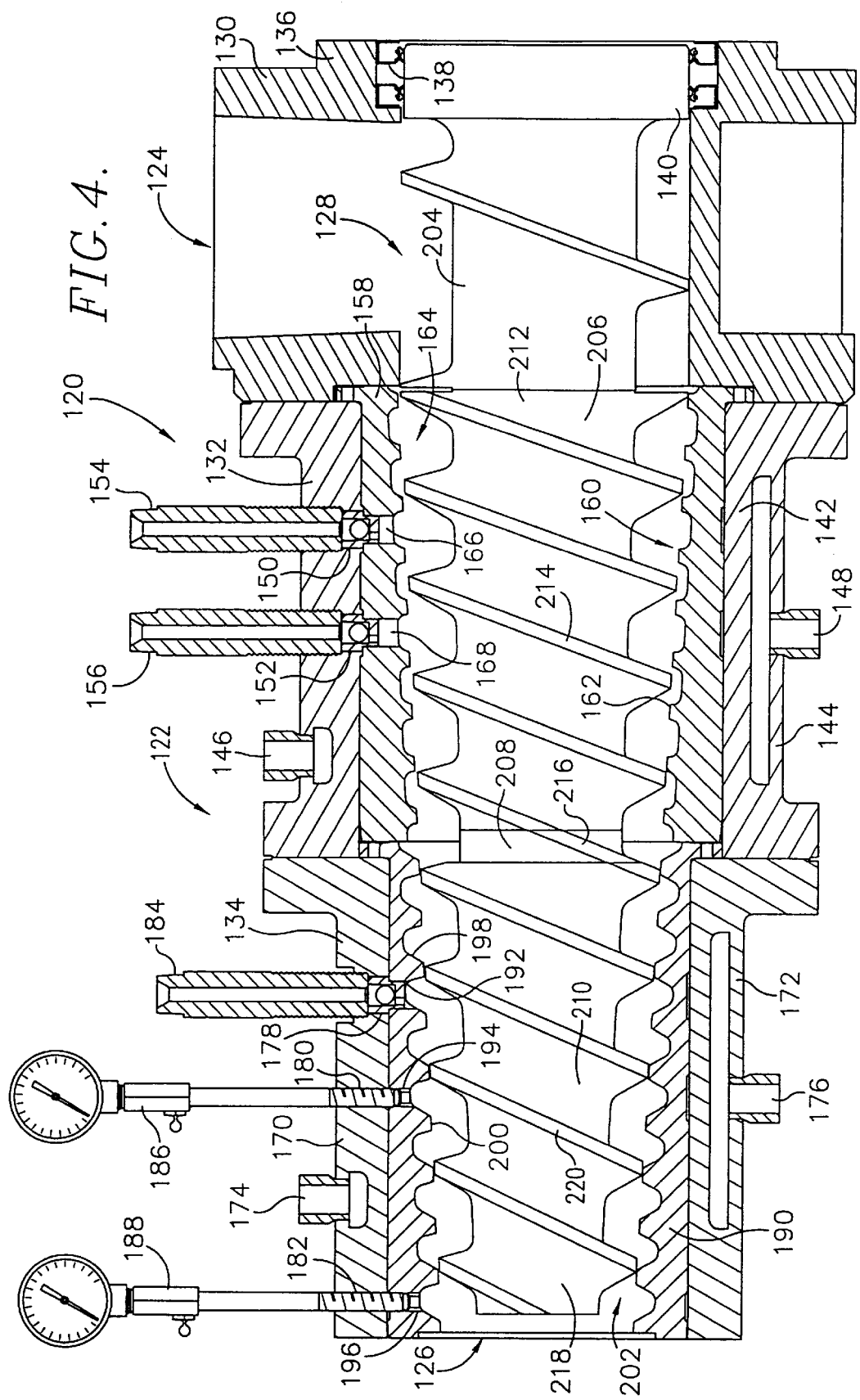
FIG. 4 is a sectional view similar to that of FIG. 1 and illustrating a short length extruder in accordance with the invention especially adapted for the production of low moisture, highly cooked, high bulk density animal feed products.

Turning now to the drawings, a short length extruder assembly 10 designed for the production of expanded food products is illustrated in FIG. 1. Broadly speaking, the assembly 10 includes a preconditioner 12 and an extruder 14. The latter includes an elongated tubular barrel 16 having an inlet 18 and an endmost, apertured extrusion die 20. An elongated, flighted, axially rotatable screw assembly 22 is disposed within barrel 16 along the length thereof.

In more detail, the preconditioner 12 is designed to initially moisturize and partially precook dry ingredients prior to passage thereof as a dough or the like into the inlet 18 of extruder 14. To this end, the preconditioner 12 is typically in the form of an elongated chamber equipped with rotatable internal paddles as well as injection ports for water and/or steam. A variety of preconditioners may be used in the context of the invention. However, it is particularly preferred to use Wenger DDC preconditioners of the type described in U.S. Pat. No. 4,752,139, incorporated by reference herein.

In the embodiment illustrated, the barrel 16 is made up of three axially aligned and interconnected tubular head sections, namely inlet head 24 and second and third sections 26, 28. The inlet head 24 is configured to present the upwardly opening extruder inlet 18 and is positioned beneath the outlet of preconditioner 12 as shown. In addition, the inlet head 24 has an apertured end wall 30 equipped with seals 32 for engaging seal block 34. The screw assembly 22 is mounted on hexagonal drive shaft 36 and is rotated via schematically depicted conventional bearing housing 39 and electric motor 39a.

The second head 26 includes an outer metallic section 38 equipped with an external jacket 40. The latter has an inlet 42 and an outlet 44 so as to permit introduction of heating or cooling media (e.g., cold water or steam) into the jacket, thus allowing indirect temperature control for the head 26. In addition, the section 38 is provided with a pair of through apertures 46, 48. As shown, an injection nipple 50 is located within aperture 46, whereas the aperture 48 has a removable plug 52 therein.

The overall head 26 further includes a removable, stationary metallic sleeve 54 secured to the inner face of section 38. The sleeve 54 has an internal surface 56 presenting helical rib sections 57 which defines an axially extending bore 58. As shown, the thickness of sleeve 54 increases along the length thereof such that the diameter of bore 58 decreases between inlet head 24 and third head 28. The sleeve 54 also has transverse apertures 59 and 59a therethrough which are in alignment with barrel section apertures 46, 48 described previously. The end of head 26 remote from inlet head 24 is equipped with an apertured stator 60 (see FIG. 2). The stator 60 includes an outboard flange 62 which is sandwiched between the heads 26, 28 as shown, as well as an inwardly extending annular segment. The segment 64 in turn has an innermost bearing ring 66 secured thereto by means of screws 68. In addition, the segment 64 is provided with a series of six circumferentially spaced, circular holes 70 therethrough. FIG. 3 illustrates another rotor/stator assembly which is identical with that depicted in FIG. 2, save for the fact that, in lieu of the holes 70, a series of six circumferentially spaced slots 70a are provided.

Third head 28 is similar in many respects to head 26 and includes an outer tubular section 72 and an outboard jacket 74, the latter equipped with an inlet 76 and outlet 78 for introduction of indirect cooling or heating media. Furthermore, the section 72 has transverse openings 80, 82 therethrough which respectively receive nipple 84 and removable plug 86.

A stationary, removable metallic sleeve 88 is positioned within section 72 and has transverse apertures 89, 89a therethrough in registry with the apertures 80, 82. The inner surface 90 of sleeve 88 presents helical ribs 89 and defines an axially extending central bore 92. The bore 92 decreases in effective diameter between the end of barrel section 28 adjacent section 26 and the end of the section 28 proximal to die 20.

The barrel 16 is completed by provision of a short annular spacer 94 positioned adjacent the end of third barrel section 28 remote from barrel section 26, together with endmost die 20. The latter in the embodiment shown is a simple metallic plate having a series of die holes 96 therethrough.

The screw assembly 22 includes four rotatable elements mounted on the shaft 36 and interconnected in an end-to-end relationship. In particular, assembly 22 has an inlet screw section 98, a first screw section 100, bearing rotor 102, and third screw section 104.

The second screw section 100 includes an elongated central shaft 106 presenting an outer, generally frustoconical surface and outwardly extending helical flighting 108. It is noteworthy that the pitch of flighting 108 is oriented at a pitch angle which is less than the pitch angle of the helical fighting 57 defined by surface 56 of sleeve 54. Moreover, it will be seen that the overall configuration of the screw section 100 conforms with the decreasing diameter of bore 58, i.e., the outer periphery of the flighting 108 progressively decreases from the inlet end of the screw section 100 to the outlet end thereof adjacent rotor 102.

The rotor 102 is mounted on shaft 36 and includes an outermost, somewhat L-shaped in cross-section annular bearing 110 which is closely adjacent annular bearing segment 66 of stator 60. The rotor 102 and stator 60 thus assists in stabilizing the screw assembly 22 during high speed rotation thereof.

The third screw section 104 is very similar to screw section 100. That is, the section 104 includes an elongated central shaft 112 presenting an outermost, frustoconical surface and helical flighting 114; the latter is oriented at a pitch angle which is less than the pitch angle of the ribs 89.

Again referring to FIG. 1, it will be observed that the overall extruder bore defined by the sleeves 54 and 88 is of generally frustoconical configuration leading from inlet 18 to die 20, i.e., the barrel bore presents a generally decreasing cross-sectional area along the length thereof. Moreover, it will be seen that the effective length of the extruder from the remote end of inlet 18 to the end of barrel 16 (shown as dimension "L" in FIG. 1) versus the maximum diameter of the barrel bore (dimension "D" in FIG. 1) is relatively low, and preferably up to about 6; the more preferred L/D ratio is from about 3–6. As used herein, "L/D ratio" refers to the ratio measured in accordance with the exemplary length and diameter illustrated in FIG. 1.

It will also be understood that the stator 60 and rotor 102 cooperatively present a flow-restricting device intermediate the length of the barrel at the region of interconnection between barrel sections 26 and 28. The overall flow-restricting device thus presents an upstream face 116 and an opposed downstream face 118. The screw assembly 22 and the flow-restricting device 60, 110 are cooperatively designed so that the material displacement per revolution of the assembly 22 adjacent face 116 is smaller than the material displacement per revolution of the assembly 22 adjacent the downstream face 118. Moreover, the assembly 22 and device 60, 110 are designed so as to substantially continuously maintain the slots 70 forming a part of the flow-restricting device full of material during operation of the extruder. In more detail, the material displacement per revolution of the screw assembly 22 adjacent downstream face 118 is up to 40% greater than the material displacement of the screw adjacent the upstream face 118; more particularly, the displacement adjacent face 118 exceeds that adjacent face 116 by a factor of from about 15–40%. Also, the depressions between adjacent ribs 89 in sleeve 88 are greater than the corresponding depressions in sleeve 54. As a consequence, the free volume within the barrel bore downstream of and adjacent flow-restricting device 60, 110 is greater than the free volume adjacent and upstream of the flow-restricting device. Quantitatively speaking, the free volume within head 28 at the region of face 118 is up to about 30% greater than the free volume within head 26 at the region of face 116, more preferably from 15–30% greater.

In typical operations employing extruders in accordance with the invention to produce expanded feeds, an edible material to be processed is first formulated and then preconditioned, followed by passage into and through the short length extruder. Normally, the starting ingredients for the material to be processed include respective quantities of protein and starch, along with amino acid and/or vitamin nutrient(s). Total amino acid content would include indigenous amino acids as well as free amino acid additives as amino acids per se or as polypeptides containing amino acid residues, and would range in content up to about 5% by weight, and more preferably up to about 2% by weight. Total vitamin content would likewise be derived from that indigenously present in the starting ingredients and as vitamin additives; total vitamin content would range up to about 2% by weight. The protein content would normally be from about 12–50% by weight, more preferably from about 18–32% by weight. Starch contents would range from about 8–50% by weight, and more preferably from about 10–30% by weight. As readily understood by those skilled in the art, the protein and starch contents are normally provided by the inclusion of desired protein- and starch-bearing ingredients of animal or plant derivation. Common starch-bearing materials would be grains such as corn, wheat, milo, rice, beets, barley and mixtures thereof. Proteinaceous ingredients could include soy, meat meal, and fish meal.

In the preferred preconditioner, the material is moisturized and at least partially cooked. Preconditioning is normally carried out so that the product leaving the preconditioner has a total moisture content of from about 15–40% by weight, and more preferably from about 22–28% by weight. The residence time in the preconditioner is usually from about 15–150 seconds, and more preferably from about 90–150 seconds; and the maximum temperature in the preconditioner ranges from about 55–212° F., and more preferably from about 180–200° F.

During passage through the extruder, the material is subjected to increasing levels of temperature and shear and is normally fully cooked as it emerges from the extrusion die. Typical residence times of the material in the extruder barrel range from about 2–40 seconds, more preferably from, about 2–15 seconds, still more preferably from about 2–9 seconds, and most preferably from about 2–6 seconds. Maximum pressure levels achieved in the extruder barrel are normally from about 150–1000 psi, and more preferably from about 300–500 psi. The maximum temperature level achieved in the extruder barrel is from about 220–300° F., and more preferably from about 230–250° F.

During extrusion processing, the apertures of the flow-restricting device 60, 110 are completely filled so as to create a choke in the barrel at the zone of the flow-restricting device and a pressure differential across the device 60, 110 (i.e., the pressure is higher at face 116 as compared with the pressure of face 118). Moreover, owing to the fact that the displacement per revolution of the screw assembly 22 adjacent downstream face 118 is greater than that proximal to the upstream face 116, the free volume downstream of the flow-restriction device is not fully choked with material. At a zone immediately adjacent the die 20, another choke of material is formed in order to assure smooth extrusion of the product through the die apertures.

Figure 5:
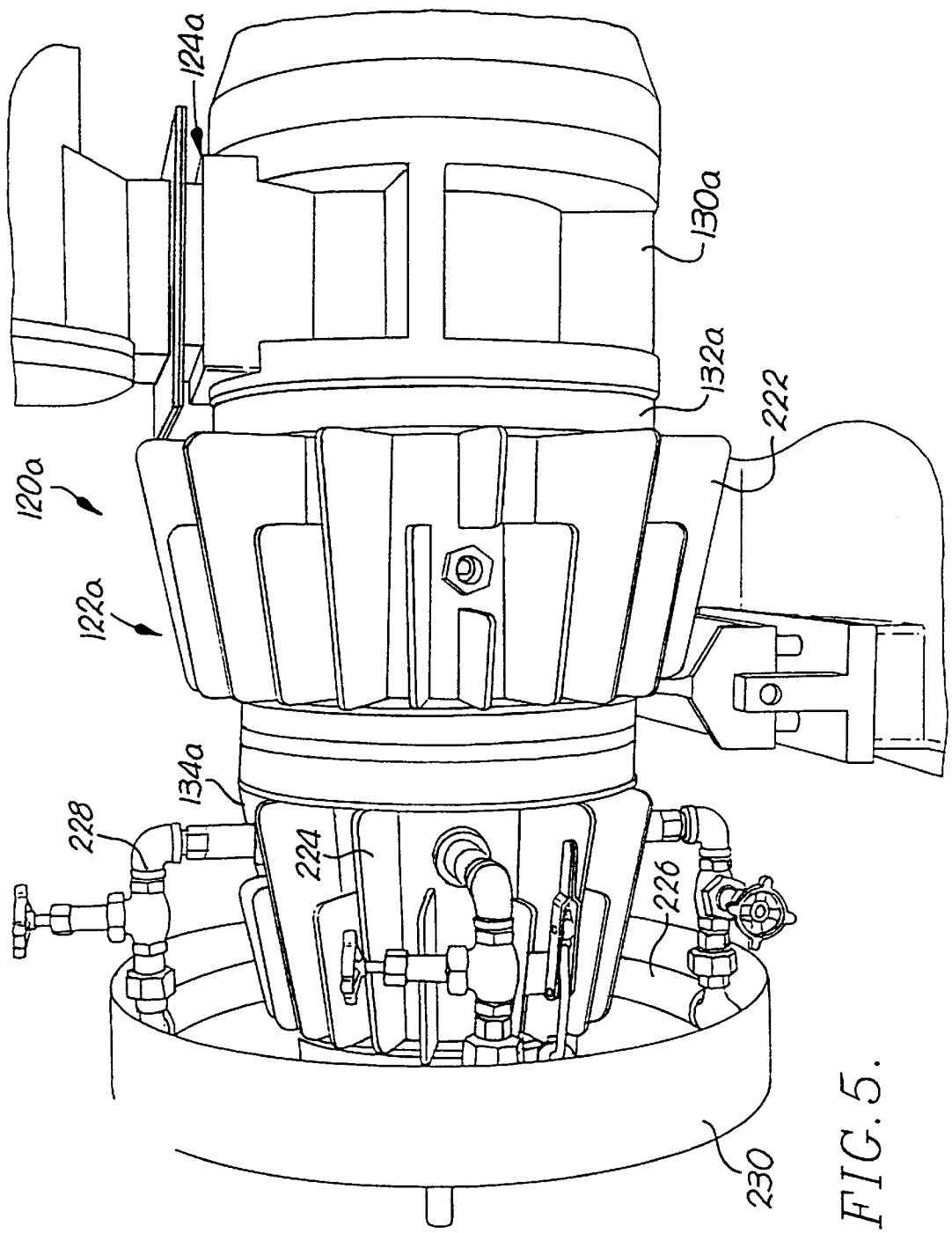
FIG. 5 is a side view illustrating the external configuration of the preferred short length extruders in accordance with the invention.

Embodiment of FIGS. 4–5

FIG. 4 is a cross-sectional view of a short length extruder 120 similar in many respects to the extruder 14 of FIG. 1, but is especially configured for the manufacture of dense, highly cooked feed products. The extruder 120 is designed for use with the same type of preconditioner 12 described previously.

The extruder 120 includes an elongated tubular barrel 122 having an inlet 124 and an outlet 126, the latter being designed to receive an apertured die of conventional design (not shown). An elongated, flighted, axially rotatable screw assembly 128 is disposed within barrel 122 along the length thereof.

The barrel 122 is made up of three axially aligned and interconnected tubular head sections, namely inlet head 130 and second and third sections 132, 134. The inlet head 130 is configured to present the upwardly opening extruder inlet 124 and is positioned beneath the outlet of a preconditioner such as preconditioner 12 (see FIG. 1). In addition, the inlet head 130 has an apertured end wall 136 equipped with seals 138 for engaging seal block 140. The screw assembly 128 is mounted on a hexagonal drive shaft and is rotated via a conventional bearing housing and electric motor, in the manner of extruder 14.

The second head 132 includes an outer metallic section 142 equipped with an external jacket 144. The latter has an inlet 146 and an outlet 148 so as to permit introduction of heating or cooling media (e.g., cold water or steam) into the jacket, thus allowing indirect temperature control for the head 132. In addition, the section 142 is provided with a pair of through apertures 150, 152. As shown, an injection nipple 154 is located within aperture 150, whereas a second nipple 156 is positioned within aperture 152.

The overall head 132 further includes a removable, stationary metallic sleeve 158 secured to the inner face of section 142. The sleeve 158 has an internal surface 160 presenting helical rib sections 162 which defines an axially extending bore 164. As shown, the thickness of sleeve 158 increases along the length thereof such that the diameter of bore 164 decreases between inlet head 130 and third head 134. The sleeve 158 also has transverse apertures 166 and 168 therethrough which are in alignment with barrel section apertures 150, 152 described previously.

Third head 134 is similar in many respects to head 132 and includes an outer tubular section 170 and an outboard jacket 172, the latter equipped with an inlet 174 and outlet 176 for introduction of indirect cooling or heating media. Furthermore, the section 170 has transverse openings 178, 180, 182 therethrough which respectively receive nipple 184 and pressure gauges 186, 188.

A stationary, removable metallic sleeve 190 is positioned within section 170 and has transverse apertures 192, 194, 196 therethrough in registry with the apertures 178–182 respectively. The inner surface 198 of sleeve 190 presents helical ribs 200 and defines an axially extending central bore 202. The bore 202 decreases in effective diameter between the end of barrel section 134 adjacent section 132 and the end of the section 134 proximal to the endmost extrusion die (not shown).

The barrel 122 is completed by provision of a die across the open face thereof. In many instances, a short annular spacer (not shown) may be positioned adjacent the end of third barrel section 134 remote from second barrel section 132, together with the endmost die.

The screw assembly 128 includes four rotatable elements mounted on the hexagonal drive shaft and interconnected in an end-to-end relationship. In particular, assembly 128 has a first inlet screw section 204, a second screw section 206, flighted transition section 208, and third screw section 210.

The second screw section 206 includes an elongated central shaft 212 presenting an outer, generally frustoconical surface and outwardly extending helical flighting 214. It is noteworthy that the pitch of flighting 214 is oriented at a pitch angle which is less than the pitch angle of the helical flighting 162 defined by surface 160 of sleeve 158. Moreover, it will be seen that the overall configuration of the screw section 212 conforms with the decreasing diameter of bore 164, i.e., the outer periphery of the flighting 214 progressively decreases from the inlet end of the screw section 206 to the outlet end thereof adjacent transition section 208.

The transition section 208 is in the form of a short cylindrical body having helical flighting 216 which is in alignment with helical flighting 214 as shown.

The third screw section 210 is very similar to screw section 206. That is, the section 210 includes an elongated central shaft 218 presenting an outermost, frustoconical surface and helical flighting 220; the latter is oriented at a pitch angle which is less than the pitch angle of the ribs 200. Moreover, the flighting 220 is aligned with flighting 216 of transition section 208.

It will be observed that the overall extruder bore defined by the sleeves 158 and 190 is of generally frustoconical configuration leading from inlet 124 to the endmost die, i.e., the barrel bore presents a generally decreasing cross-sectional area along the length thereof. The extruder 120 also has essentially the same L/D ratio as extruder 14 described previously.

FIG. 5 illustrates an alternate external configuration for extruder 120. That is, the extruder 120a of FIG. 5 has the same internal configuration as extruder 120. However, the second and third heads 132a and 134a of the extruder barrel 122a are not equipped with external jackets. Rather, head cooling is effected by means of a series of radially outwardly extending, circumferentially spaced cooling fins 222 and 224 provided on the heads 132a, 134a, respectively. The FIG. 5 embodiment also illustrates a circular steam manifold pipe 226 disposed about the outlet end of head 134a, with a total of four spaced apart separately valved steam injection pipe assemblies 228 coupled with manifold pipe 226. Each of the assemblies 228 extends through the wall of barrel section 134a, so as to permit direct injection of steam into the confines of the extruder 120a. The manifold pipe 226 is covered by a perforate guard 230 as shown.

The production of highly cooked, dense feed products using the apparatus of FIGS. 4–5 proceeds generally as described with reference to the production of expanded feed products, i.e., the starting formulation is preconditioned and then fed into and through extruder 120 or 120a. However, in order to produce the desired feeds, some alteration of the process is necessary, most notably the moisture content of the starting material and final product.

For example, a starting formulation would normally have a relatively high grain content, at least about 60% by weight and more preferably at least about 80% by weight. The grain fraction could be derived from any of the aforementioned grain sources. Total protein for the starting formulations would usually range from about 12–50% by weight, more preferably from about 18–32% by weight, whereas starch contents would range from about 8–50% by weight and more preferably from about 10–30% by weight. Protein and/or starch can be provided by appropriate protein and starch-bearing materials or through direct addition of desired proteins and starches.

During preconditioning, the material is moisturized to a maximum of about 30% by weight, more commonly up to about 22% by weight. Temperature conditions within the preconditioner would range from about 135–200° F. and more preferably from about 150–190° F. Residence times in the preconditioner would generally be the same as those set forth above for processing of expanded feed products.

During passage through the extruder, the preconditioned material is at least partially cooked by the action of heat and shear. Residence times of the preconditioned material in the extruder barrel are the same as those described above, i.e., from about 2–40 seconds, more preferably from about 2–15 seconds, still more preferably from about 2–9 seconds and most preferably from about 2–6 seconds. Maximum pressure conditions within the extruder barrel are experienced just upstream of the final extrusion die, and generally range from about 25–400 psi, more preferably from about 75–250 psi.

The dense product emerging from the extrusion die has a relatively low moisture of up to about 20% by weight, more preferably up to about 18% by weight. The hot extruder product can then be allowed to cool/dry in ambient air to achieve final equilibrated moisture levels of from about 10–15% by weight, more preferably around 12% by weight.

The following examples set forth preferred extrusion apparatus and methods in accordance with the invention. It is to be understood that the invention is not so limited and nothing in the examples should be taken as a limitation upon the overall scope of the invention.

As used herein, "pellet durability index" and "PDI" refer to an art recognized durability test described in *Feed Manufacturing Technology IV*, American Feed Association, Inc., 1994, pages 121–122 (and referenced information), incorporated by reference herein. In such a durability test, the durability of pellets obtained immediately after cooling when the pellets have a temperature within 10° F. of ambient temperature. Durability is determined by tumbling a 500 g sample of pre-sieved pellets (to remove fines) for 5 minutes at 50 rpm in a dust-tight 12"×12"×5" enclosure equipped with a 2"×9" internal plate affixed symmetrically along a 9" side to a diagonal of one 12"×12" dimension of the enclosure. The enclosure is rotated about an axis perpendicular to and centered on the 12" sides thereof. After tumbling, fines are removed by screening, and the pellet sample is reweighed. Pellet durability is defined as:

$$\text{durability} = \text{weight of pellets after tumbling} / \text{weight of pellets before tumbling} \times 100$$

Example 1

In this example, a short length extruder in combination with a preconditioner was employed in the manufacture of high quality expanded pet food at commercial production rates.

The extruder was of the type depicted in FIG. 1, and consisted of three heads. In particular, the extruder configuration used in Runs #1, #2 and #4 was made up of the following components (where all parts are identified with Wenger Mfg. Co. part numbers): extruder barrel—65695-001 (inlet head); 65676-001 (head No. 2); and 65689-001 (head No. 3). Head No. 2 was equipped with internal liner 65691-001 and a stator 76598-001 between the second and third heads. Screw assembly—76597-001 (shaft); 65670-001 (inlet screw); 65671-001 (second screw section); 65906-003 (stationary shearlock between second and third screw sections comprising 65907-001 (rotor) and 65909-001 (stator)); and 65675-001 (third screw section). Final die—65534-009 (1" spacer); 65421-001 (die plate); and 31350-779 (die insert giving ⅜" die openings). A rotating knife assembly was positioned adjacent the outlet of the die for cutting the extrudate into a convenient size. The knife assembly included the following: 19462-023 (knife holder) and ten knife blades (19512-003). The extruder employed on Runs #3 and #5 was identical with that described above, except that the shaft employed was Wenger Part No. 76597-001 and the final screw section (Wenger Part No. 65675-005) was of cut flight configuration.

The preconditioner used in both of these setups was a Wenger DDC preconditioner having the standard 60—60 configuration.

In all of the five test runs, the starting pet food recipe was made up of 24% by weight poultry meal, 54% by weight corn meal, 8% by weight wheat, 8% by weight corn gluten meal, and 6% by weight soybean meal. In each case, the starting material was fed into and through the preconditioner for moisturizing and partial cooking thereof, followed by passage through the three head extruder. Water and sometimes steam was injected into the extruder barrel at the second and third head injection ports. Subsequent to extrusion, the product was conventionally dried to a moisture content of about 9–11% by weight.

The following table sets forth the operating conditions for the preconditioner and extruder devices in the five runs.

TABLE 1

|  |  | RUN #1 | RUN #2 | RUN #3 | RUN #4 | RUN #5 |
|---|---|---|---|---|---|---|
| RAW MATERIAL INFORMATION: | | | | | | |
| Dry Recipe Density | kg/m$^3$ | 577 | 577 | 577 | 577 | 577 |
| Dry Recipe Rate | kg/hr | 2000 | 3000 | 3000 | 3500 | 3000 |
| Feed Screw Speed | rpm | 53 | 76 | 72 | 87 | 48 |
| PRECONDITIONING INFORMATION | | | | | | |
| Preconditioner Speed | rpm | 125/250 | 125/250 | 125/250 | 125/250 | 125/250 |
| Steam Flow to Preconditioner | kg/hr | 200 | 285 | 270 | 280 | 271 |
| Water Flow to Preconditioner | kg/hr | 300 | 540 | 540 | 655 | 482 |
| Preconditioner Water Temperature | °C. | | | | 61 | 61 |
| EXTRUSION INFORMATION: | | | | | | |
| Extruder Shaft Speed | rpm | 592 | 592 | 592 | 592 | 592 |
| Motor Load | % | 63 | 60 | 83 | 88 | 63 |
| Steam Flow to Extruder | kg/hr | — | — | — | — | 60 |
| Water Flow to Extruder | kg/hr | 30 | 60 | 76 | 85 | 60 |
| Control/Temperature-1st Head | °C. | | | | 83 | 87 |
| Control/Temperature-2nd Head | °C. | 86 | 109 | 101 | 102 | 101 |
| Control/Temperature-3rd Head | °C. | 93 | 110 | 76 | 98 | 98 |
| Head/Pressure | kPa | 3/NA | 3/NA | 3/2068 | 2200 | 2250 |
| FINAL PRODUCT INFORMATION: | | | | | | |
| Extruder Discharge Rate | kg/hr | 320 | 400 | 320 | | |
| Extruder Discharge Density | kg/m$^3$ | | | | 368 | 352 |
| Extruder Performance | | Stable | Stable | Stable | Stable | Stable |
| Duration of Run | min. | 15 | 15 | 8 | 15 | 30 |
| Final Product Description | in. | 3/8 chunk | 3/8 chunk | 3/8 chunk | 3/8 pellet | 3/8 pellet |

All of the runs gave commercially acceptable, fully cooked and formed products. The bulk density of the product from Run #1 was found to be about 19 lbs/ft$^3$.

Example 2

In this example, a short length preconditioner/extruder of the type shown in FIG. 4 was used to manufacture a high quality, dense, hard pig finishing feed. The resultant product was equivalent if not superior to those conventionally produced using an expander and pellet mill.

Specifically, the three-head extruder configuration used in Runs 6 and 7 was made up of the following components (where all parts are identified with Wenger Mfg. Co. part numbers): extruder barrel—65695-001 (inlet head); 65676-001 (head No. 2); and 65689-001 (head No. 3). Head No. 2 was equipped with internal sleeve 65691-001, whereas head 3 also had an internal sleeve, 76598-001. Screw assembly—76597-002 (shaft); 65670-001 (inlet screw); 65671-001 (first screw section); 65906-001 (second screw section) and 65676-001 (third screw section). Final die—66532-103 BH, 65534-009 AD, 74010-953 NA, 74010-954 NA, with 13 inserts. A rotating knife assembly was positioned adjacent the outlet of the die for cutting the extrudate into a convenient size. The knife assembly included the following: 19462-001 (knife blade holder) and six knife blades (19430-007).

In the case of Runs 8 and 9, the extruder configuration was made up of the following components: extruder barrel—65695-001 (inlet head); 65676-001 (head No. 2); and 65689-001 (head No. 3). Head No. 2 was equipped with internal sleeve 65691-001, whereas head 3 also had an internal sleeve, 76598-001. Screw assembly—76597-001 (shaft); 65670-001 (inlet screw); 65671-001 (first screw section); 65658-015 (second screw section); and 65675-001 (third screw section). Final die—6534-009 AD and 65421-001 BH. A rotating knife assembly was positioned adjacent the outlet of the die for cutting the extrudate into a convenient size. The knife assembly included the following: 19607-017 (knife blade holder) and five knife blades.

The preconditioner used in both of these setups was a Wenger Model 16 DDC preconditioner having Configuration No. 377. The left and right shafts were each equipped with a total of sixty beaters.

In Runs 6–9 inclusive, the starting recipe was made up of 76.96% by weight milo, 15.95% by weight soybean meal, 4.69% by weight tallow, 0.94% by weight salt, 0.94% by weight calcium carbonate, 0.41% by weight vitamin premix, and 0.11% by weight lysine. In each case, the starting material is fed into and through the preconditioner for moisturizing and partial cooking thereof followed by passage through the three head extruder. Water was injected into the extruder barrel in Runs 7–9. Runs 6 and 7 were somewhat unstable but Runs 8 and 9 were stable and gave good, high density pig feeds. Subsequent to extrusion, the product was cooled using a multiple pass cooler to achieve final densities of 35 lb/ft$^3$ (Run 6), 36 lb/ft$^3$ (Run 7), 45.4 lb/ft$^3$ (Run 8), and 45.0 lb/ft$^3$ (Run 9).

The following table sets forth the operating conditions for the preconditioner and extruder devices in the four runs.

TABLE 2

|  |  | RUN #6 | RUN #7 | RUN #8 | RUN #9 |
|---|---|---|---|---|---|
| RAW MATERIAL INFORMATION: | | | | | |
| Dry Recipe Density | kg/m$^3$ | 688 | 688 | 688 | 688 |
| Dry Recipe Rate | kg/hr | 1500 | 1800 | 3000 | 4000 |

TABLE 2-continued

|  |  | RUN #6 | RUN #7 | RUN #8 | RUN #9 |
|---|---|---|---|---|---|
| Feed Screw Speed | rpm | 31 | 37 | 64 | 78 |
| PRECONDITIONING INFORMATION |  |  |  |  |  |
| Steam Flow to Preconditioner | kg/hr | 62 | 54 | 210 | 283 |
| Water Flow to Preconditioner | kg/hr | 182 | 72 | 60 | 80 |
| Preconditioner Additive 1 Rate | kg/hr | 75 | 36 | 0 | 0 |
| Preconditioner Discharge Temp. | ° C. | 69 | 73 | 85 | 86 |
| EXTRUSION INFORMATION: |  |  |  |  |  |
| Extruder Shaft Speed | rpm | 592 | 592 | 592 | 591 |
| Motor Load | % | 70 | 95 | 47 | 38 |
| Water Flow to Extruder | kg/hr | — | 36 | 30 | 40 |
| Control/Temperature-2nd Head | ° C. | 66 | 58 | 56 | 49 |
| Control/Temperature-3rd Head | ° C. | 90 | 98 | 106 | 117 |
| Head/Pressure | kPa | 340 | 304 | 502 | 3/690 |
| Knife Drive Speed | rpm | 350 | 350 | 610 | 770 |
| FINAL PRODUCT INFORMATION: |  |  |  |  |  |
| Extruder Discharge Density | kg/m³ | 548.7 | 560.9 | 675 | 673 |
| Final Product Description |  | pig feed | pig feed | pig feed | pig feed |
| Run Rating |  | Fair | Fair | Good | Good |

The higher densities achieved in Runs 8 and 9 are believed chiefly attributable to the different die assembly employed as compared with Runs 6 and 7.

Although the extruder device specifically described herein is of the single screw type, it will be understood that short length twin screw extruders may also be fabricated and used in accordance with the invention.

Example 3

In this example, swine feeds were produced in accordance with the invention incorporating therein lysine and a vitamin premix containing vitamin A in order to determine the extent of lysine and vitamin A degradation occurring during processing.

The three-head extruder used in these runs was of the type shown in FIG. 4 and made up of the following components (where all parts are identified with Wenger Mfg. Co. parts numbers): extruder barrel—65695-001 (inlet head); 65676-001 (head No. 2); and 65689-001 (head No. 3). Head No. 2 was equipped with internal sleeve 65691-001, whereas head 3 also had an internal sleeve, 76598-001. Screw assembly—76597-001 (shaft); 65670-001 (inlet screw); 65671-001 (first screw section); 65658-015 (second screw section); and 65675-001 (third screw section). Final die—65534-009 AD, 65421-001 BH, 74010-955 NA, with ten inserts. A rotating knife assembly was positioned adjacent the outlet of the die and included: 19607-017 (knife blade holder) and five knife blades. The preconditioner used in these runs was a Wenger Model 16 DDC having Configuration No. 377. The left and right shafts were each equipped with a total of 60 beaters.

In Runs 10–11, the starting recipe was made up of 76.96% by weight milo, 15.95% by weight soybean meal, 4.69% by weight tallow, 0.94% by weight salt, 0.94% by weight calcium carbonate, 0.41% by weight vitamin premix, and 0.11% by weight lysine. The following table sets forth the operating conditions for the preconditioner and extruder device used in these two runs.

TABLE 3

|  |  | RUN #10 | RUN #11 |
|---|---|---|---|
| RAW MATERIAL INFORMATION: |  |  |  |
| Dry Recipe Moisture | % wb | 11.52 | 11.52 |
| Dry Recipe Density | kg/m³ | 688 | 688 |
| Dry Recipe Rate | kg/hr | 3000 | 4000 |
| Feed Screw Speed | rpm | 64 | 78 |
| PRECONDITIONING INFORMATION |  |  |  |
| Preconditioner Speed | rpm | 250 | 250 |
| Steam Flow to Preconditioner | kg/hr | 210 | 283 |
| Water Flow to Preconditioner | kg/hr | 60 | 80 |
| Moisture Entering Extruder | % wb | 16.05 | 16.75 |
| Preconditioner Discharge Temp. | ° C. | 85 | 86 |
| EXTRUSION INFORMATION: |  |  |  |
| Extruder Shaft Speed | rpm | 592 | 591 |
| Motor Load | % | 47 | 38 |
| Water Flow to Extruder | kg/hr | 30 | 40 |
| Control/Temperature-2nd Head | ° C. | 56 | 49 |
| Control/Temperature-3rd Head | ° C. | 106 | 117 |
| Head/Pressure | kPa | 3/520 | 3/690 |
| Knife Drive Speed | rpm | 610 | 770 |
| FINAL PRODUCT INFORMATION: |  |  |  |
| Extruder Discharge Moisture | % wb | 15.07 | 16.70 |
| Extruder Discharge Density | kg/m³ | 657 | 673 |
| Cooler Discharge Density | lb/ft³ | 45.4 | 45 |
| Cooler Discharge Moisture | % wb | 13.5 | 11.98 |
| Final Product Description |  | pig feed | pig feed |
| Run Rating |  | Good | Good |

Cooling of the respective extrudates was carried out in a two-pass dryer/cooler. In the case of Run 10, the zone 1 temperature was 42° C. and zone 2 temperature was 39° C. Retention times were 2.7 min. past 1, and 5 min. past 2. Fan speeds 1–4 were 1597, 1638, 1078 and 1038 rpm, respectively. In Run 11, the zone 1 and zone 2 temperatures were 41° C. and 39° C. respectively, whereas retention times were 2.7 min. and 5 min. respectively. Fan speeds 1–4 were 1579, 1635, 1078 and 1038 rpm, respectively.

The pig feed extrudates were analyzed and found to have for Run 10: piece density of 1.2245 g/ml, PDI (pellet durability index) of 99.4%, fat uptake of 8% by weight, and piece density after cooling of 1.2482 g/ml. For Run 11: piece density of 1.203 g/ml, PDI of 99.0%, and fat uptake of 11.0% by weight.

In addition, the pig feed extrudates from Runs 10 and 11 were tested for available lysine, vitamin A and mold count. These test results are set forth below:

TABLE 4

| Sample | Available Lysine (% by weight) | Vitamin A (IU/kg) | Mold Count (CFU/g) |
|---|---|---|---|
| Raw recipe | 0.70 | 1,777 | 300,000 |
| Run 10 | 0.71 | 2,545 | <10 |
| Run 11 | 0.72 | 2,695 | <10 |

These data demonstrate that the products from Runs 10 and 11 experienced no lysine or vitamin A loss, and complete destruction of molds, indicating that additional aflotoxins or other toxins will not be formed after extrusion. Salmonella tests on the feeds were also negative. These results are to be contrasted with typical available lysine and vitamin A losses experienced in conventional extrusion processes. For example, pig feeds produced using conventional equipment commonly give lysine losses of 14–15% by weight, and vitamin A losses on the order of 40% by weight.

It is believed that the extremely short extruder residence times achieved with the present invention give the essentially complete retention of lysine and vitamin content in the finished extrudates; the approximate extruder barrel residence times for Runs 10–11 were measured by color tracer injection and found to be about 3–4 seconds. At the same time however, such extrudates are sufficiently cooked and otherwise highly palatable products.

Example 4

In this series of tests, dense, relatively hard pig feed products were produced using an extruder as shown in FIG. 5. Two separate recipes were used: in Runs #12–13, 80% by weight milo, 18% by weight soybean meal, 1% by weight calcium carbonate, and 1% by weight salt, with the dry ingredients having a moisture content of 10.9% by weight, wet basis; in Runs #14–24, 80% by weight corn, 18% by weight soybean meal, 1% by weight calcium carbonate, and 1% by weight salt, with the dry ingredients having a moisture content ranging from 9.39% (Run #22) to 11.63% by weight, wet basis (Run #20). In all runs, the dry ingredients were ground through a 1/16-inch screen, and during preconditioning, 2% by weight tallow was added.

The preconditioner used in all runs was a Wenger Model 16 DDC, using configuration No. 377 where the left shaft was equipped with 60 beaters (12 at 75° forward, 24 at 90° neutral and 24 at −75° reverse), and the right shaft had 60 beaters (12 at 75° forward and 48 at −75° reverse).

In Runs #12–17 and 20–23, the extruder configuration included: extruder barrel—65695-001 (inlet head 1), 65676-001 (head 2) and 65689-001 (head 3); extruder sleeves—65691-001 (in head 2), and 76598-001 (in head 3); extruder shaft—76597-001; rotating elements mounted on shaft—65670-001, 65671-001, 65658-013 and 65675-001. For Runs #18–19, the extruder configuration included: extruder barrel—65695-001 (inlet head 1), 65676-001 (head 2), 65689-001 (head 3); extruder sleeves—65691-001 (in head 2), and 65693-001 (in head 3); extruder shaft—76597-001; rotating elements mounted on shaft—65670-001, 65671-001, 65658-013 and 65675-001. The most preferred extruder configuration was used in Run #24 and was the same as that for Runs #12–17 and 20–23, except that the cone outlet screw had a 15° taper with an additional 1/4 spacer in front of the cone outlet screw to move it closer to the discharge end of the extruder. This configuration is specifically illustrated in FIG. 4.

The die and knife assembly used in Runs #12–21 included: dies and adaptors 53661-005 NA, 65421-001 BH and 74010-955 NA, with ten inserts, six 6 mm diameter holes for each insert, 15 mm land length; knife holder—19462-023 carrying five 19430-003 knife blades. The assembly used in Runs #22–24 included: dies and adaptors 53661-005 NA, 65421-001 BH and 74010-752 NA, three 1/4" holes for each insert, 1/2" land length; knife holder—19462-023 carrying ten 19430-003 knife blades.

The following table sets forth the run conditions for this series of experiments.

TABLE 5

| | | Run #12 | Run #13 | Run #14 | Run #15 | Run #16 | Run #17 | Run #18 | Run #19 | Run #20 | Run #21 | Run #22 | Run #23 | Run #24 |
|---|---|---|---|---|---|---|---|---|---|---|---|---|---|---|
| RAW MATERIAL INFORMATION: | | | | | | | | | | | | | | |
| Dry Recipe Density | kg/m³ | 620 | 620 | 620 | 620 | — | — | 620 | 620 | 620 | 620 | 620 | 620 | 620 |
| Dry Recipe Rate | kg/hr | 3000 | 4000 | 4000 | 5000 | 6000 | 4000 | 4000 | 4000 | 4000 | 4000 | 4000 | 4000 | 4000 |
| Feed Screw Speed | rpm | 63 | 93 | 92 | 123 | 136 | 91 | 89 | 93 | 88 | 83 | 83 | 85 | 83 |
| PRECONDITIONING INFORMATION | | | | | | | | | | | | | | |
| Preconditioner Speed | rpm | 250 | 250 | 250 | 250 | 250 | 250 | 250 | 250 | 250 | 250 | 250 | 250 | 250 |
| Steam Flow to Preconditioner | kg/hr | 210 | 280 | 280 | 278 | 279 | 277 | 280 | 280 | 120 | 120 | 200 | 200 | 120 |
| Water Flow to Preconditioner | kg/hr | 60 | 80 | 120 | 150 | 240 | 280 | 120 | 120 | 40 | 40 | 160 | 80 | 200 |
| Moisture Entering Extruder | % wb | — | 17.17 | 19.33 | 18.99 | 18.68 | 20.76 | 18.18 | 19.38 | 17.02 | — | 17.85 | 14.64 | — |
| Preconditioner Discharge Temp. | °C. | 87 | 83 | 83 | 75 | 72 | 80 | 84 | 87 | 60 | — | 67 | 72 | 60 |
| EXTRUSION INFORMATION: | | | | | | | | | | | | | | |
| Extruder Shaft Speed | rpm | 592 | 592 | 592 | 592 | 592 | 522 | 650 | 960 | 960 | 592 | 592 | 592 | 592 |
| Motor Load | % | 60 | 73 | 46 | 55 | 59 | 53 | 65 | 88 | 86 | 73 | 47 | 69 | 70 |
| Water Flow to Extruder | kg/hr | 30 | 30 | 80 | 100 | 120 | 228 | 80 | 80 | 240 | 240 | 160 | 40 | 200 |
| Control/Temperature-2nd Head | °C. | 61 | 66 | 69 | 69 | 67 | 67 | 74 | 75 | 60 | 60 | 69 | 67 | 60 |
| Control/Temperature-3rd Head | °C. | 122 | 122 | 113 | 108 | 107 | 111 | 131 | 142 | 113 | 113 | 103 | 125 | 114 |
| Head/Pressure | kPa | — | — | — | — | — | — | 5350 | 5670 | 5590 | — | — | 1100 | 780 |
| Knife Drive Speed | rpm | 545 | 545 | 740 | — | — | — | — | — | — | — | 1228 | 1130 | 540 |
| FINAL PRODUCT INFORMATION: | | | | | | | | | | | | | | |
| Extruder Discharge Moisture | % wb | — | 15.03 | 17.28 | 18.79 | 18.30 | 24.13 | 16.49 | 16.63 | 15.59 | — | 18.30 | 14.79 | — |
| Extruder Discharge Density | kg/m³ | 609 | 617 | 640 | 625 | 617 | 600 | 620 | 520 | 592 | 608 | 640 | 640 | 649 |
| Run Rating | | Good | Good | Good | Good | Good | Good | Good | Fair | Good | — | Good | Good | Good |

Runs #12–17 were all run at an extruder shaft speed of less than 600 rpm. In the case of Runs #18–20, the extruder shaft speed was significantly increased. This caused a very significant increase in pressure just upstream of the die and a corresponding significant increase in extruder motor load. In the case of Run #23, a flighted transition shearlock was provided between heads 2 and 3, which served to keep the product from backing up in the middle of head 3 and resulted in easier operational control. The final Run #24 employed a cone screw with a 15° taper, the flighted shearlock transition of Run #23, and with an additional 1/4" spacer to move the end of the screw closer to the discharge die. This gave the best product and performance of any of the runs.

All of the products were dense, relatively hard swine feed products having a high degree of cook, yet were capable of rapidly absorbing water, making them ideal swine feed products.

The preferred dense animal feeds produced in accordance with the present invention are in the form of extruded bodies of low moisture (preferably up to about 20% by weight moisture wet basis directly from the extruder and more preferably up to about 18% by weight) exhibiting at least about 60% gelatinization (more preferably from about 65–85% gelatinization) of the starch-bearing components thereof, with a PDI of at least about 90 and more preferably at least about 95. The products are thus highly cooked and have essentially no residual bacteria. The extruded bodies are also relatively hard, and have bulk densities of at least about 28 pounds per cubic foot and more preferably at least about 30 pounds per cubic foot. Despite the hardness of the extruded bodies, they are also able to readily absorb moisture. Specifically, the products hereof, upon submersion in 58° F. water for a period of 4 minutes, should exhibit a maximum resistance to crushing which is less than about 70% (and more preferably less than about 60%) of the maximum resistance to crushing of the product prior to water submersion. Furthermore, upon submersion in 58° F. water for period of 8 minutes, the products of the invention should have a maximum resistance to crushing of up to about 40% (and more preferably up to about 30%) of the maximum resistance to crushing of the product prior to water submersion. Such crush resistance tests are preferably performed using a Model TA.XT2 Texture Analyzer sold by Texture Technologies Corp of Scarsdale, N.Y.

Figure 6:
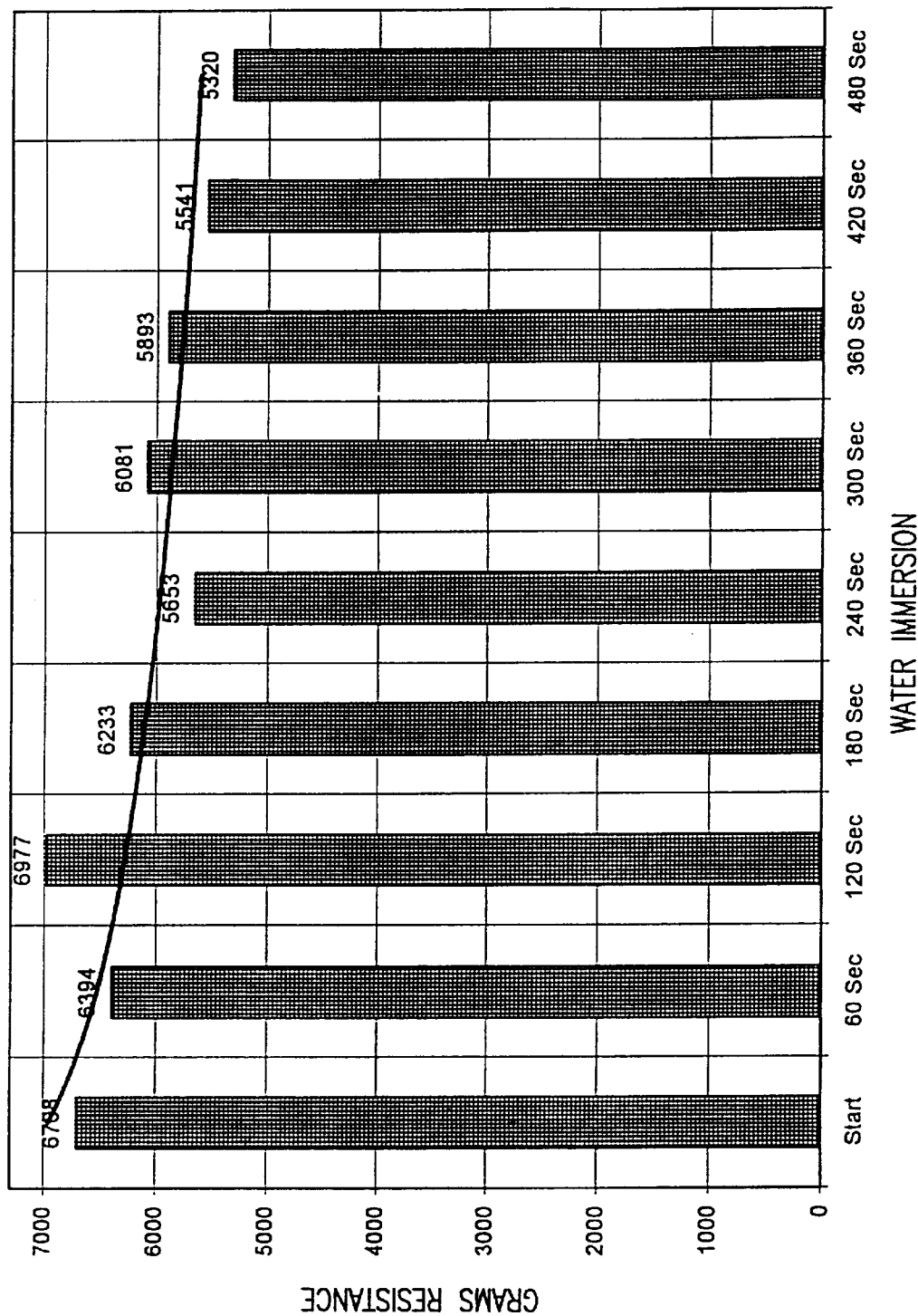
FIG. 6 is a bar graph with a best fit logarithmic curve applied to the data of a series of water absorption/pellet dispersion tests wherein extruded prior art pig feed was tested for initial crush resistance and for crush resistance at one minute intervals during immersion of the feed in 58° F. water.
Figure 7:
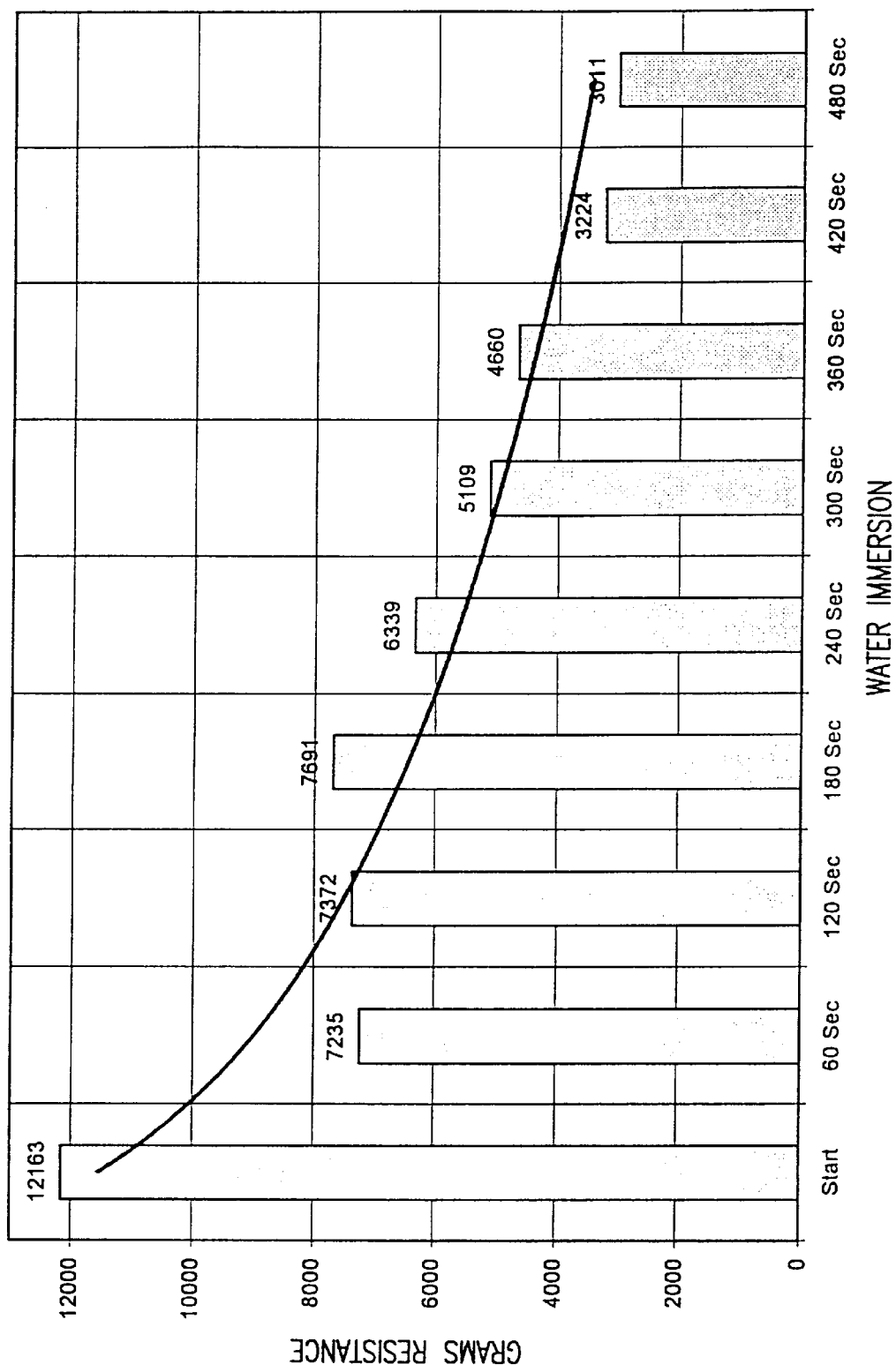
FIG. 7 is a bar graph similar to that of FIG. 6 but illustrating the same type of water absorption/pellet dispersion crush resistance test data for a pig feed produced in accordance with the present invention.
Figure 8:
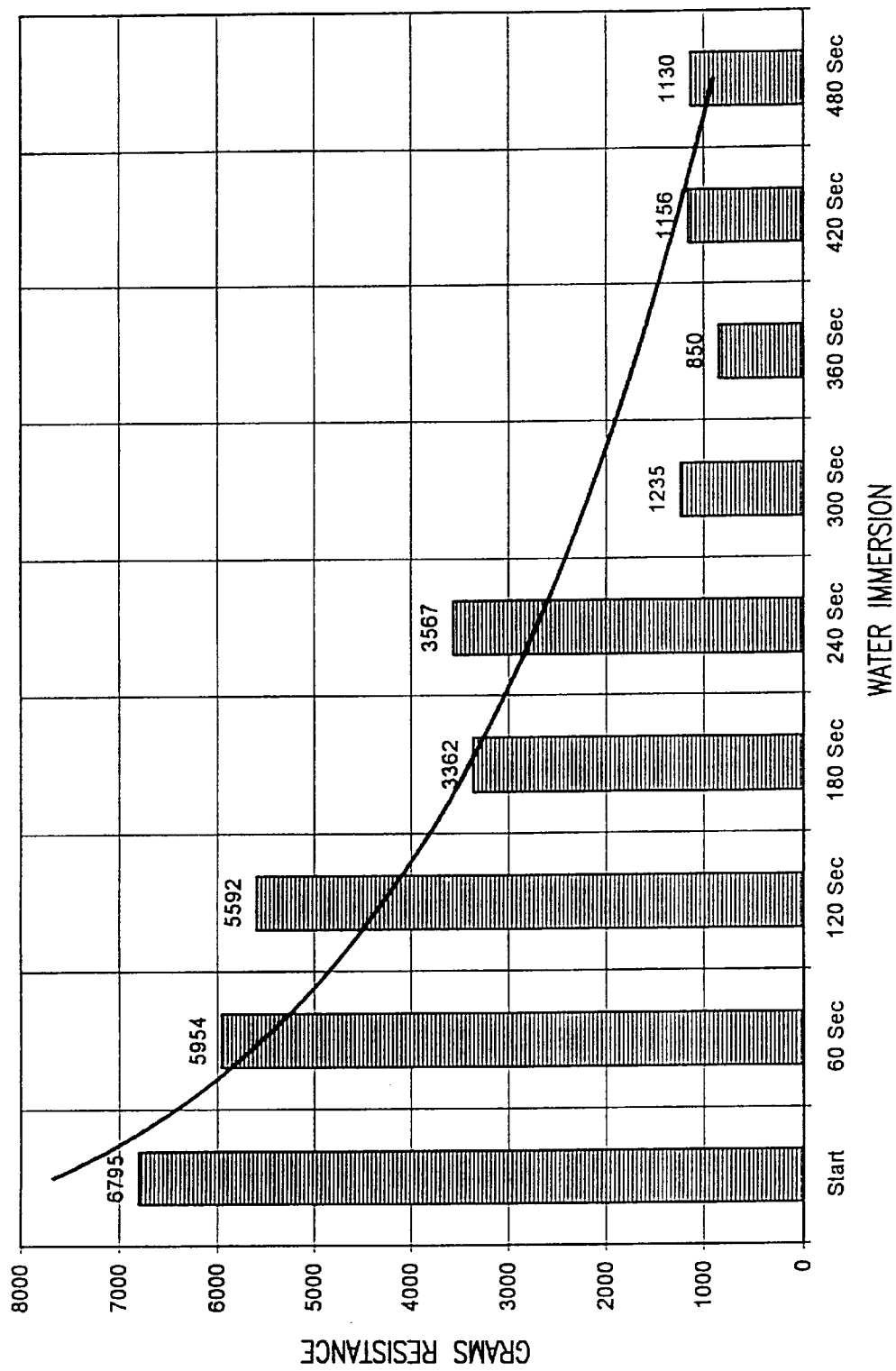
FIG. 8 is a bar graph similar to that of FIGS. 6–7 but illustrating the same type of water absorption/pellet dispersion crush resistance test data for a prior art pig feed made using a pellet mill.

In this connection, attention is directed to FIGS. 6–8. FIG. 6 is a bar graph with an applied best-fit logarithmic curve illustrating crush resistance tests using traditional extruded swine feeds. Note that after four minutes immersion in 58° F. water, the crush resistance of the traditional extruded product was approximately 83.5% as compared with the starting non-immersed product; and after eight minutes of immersion, the crushed resistance was about 78.6% on the same basis. FIG. 7 is a similar graph and logarithmic curve showing the crush resistance of swine feeds produced in accordance with the present invention. The particular product tested in this figure was from Run #13 of Example 4. As illustrated, after four minutes of immersion, the products of the invention exhibited a crush resistance of about 52% as compared with the non-immersed starting product, whereas after eight minutes, the crush resistance was only about 24.7%. FIG. 8 is similar to FIGS. 6 and 7, but depicts the crush resistance properties of a conventional swine feed prepared by typical pelleting processes. The crush resistance data is very similar to that of the present invention (52.7% crush resistance after four minutes immersion as compared with the starting product, and 16.6% crush resistance after eight minutes immersion), thus demonstrating that the extruded products of the present invention are similar to traditional pelleted products in terms of water absorption and pellet dispersion.

This series of runs also demonstrated that the material undergoing extrusion experiences a very rapid increase in pressure just upstream of the final extrusion die. In fact, use of the dual pressure gauges 186 and 188 (see FIG. 4) reveals that the pressure at the remote gauge 186 is essentially atmospheric whereas the pressure at the adjacent gauge 188 ranges from 780–1100 kPa (111–157 psi). Broadly speaking, the pressure within said extruder barrel at a point spaced rearwardly from the inner face of the extrusion die axially along the length of said screw assembly a distance equaling 1.5 times the largest diameter D of the extruder barrel should be essentially atmospheric. The pressure within said extruder barrel immediately adjacent said inner face of said extrusion die should be at least about 100 psi, and more preferably at least about 300 psi.

It has also been found that the "tip speed" of the extruder screw assembly can be an important parameter. The tip speed is the velocity of the extreme end of the extrusion screw closest the extrusion die. The tip speed should be from about 400–1600 ft/min., more preferably from about 600–1200 ft/min., and most preferably about 700–900 ft/min.

In order to further illustrate the marked differences between pellets in accordance with the invention and traditional products, comparative swine feed pellets produced on a pellet mill and in accordance with the present invention were examined by taking scanning electron micrographs of the products. In each case, the representative pellet was sliced longitudinally with a razor blade and standard SEM procedures were followed for obtaining the micrographs. The SEM of the conventional pellet mill product is shown in FIG. 9, whereas the SEM of the improved product of the invention is depicted in FIG. 10.

Figure 9:
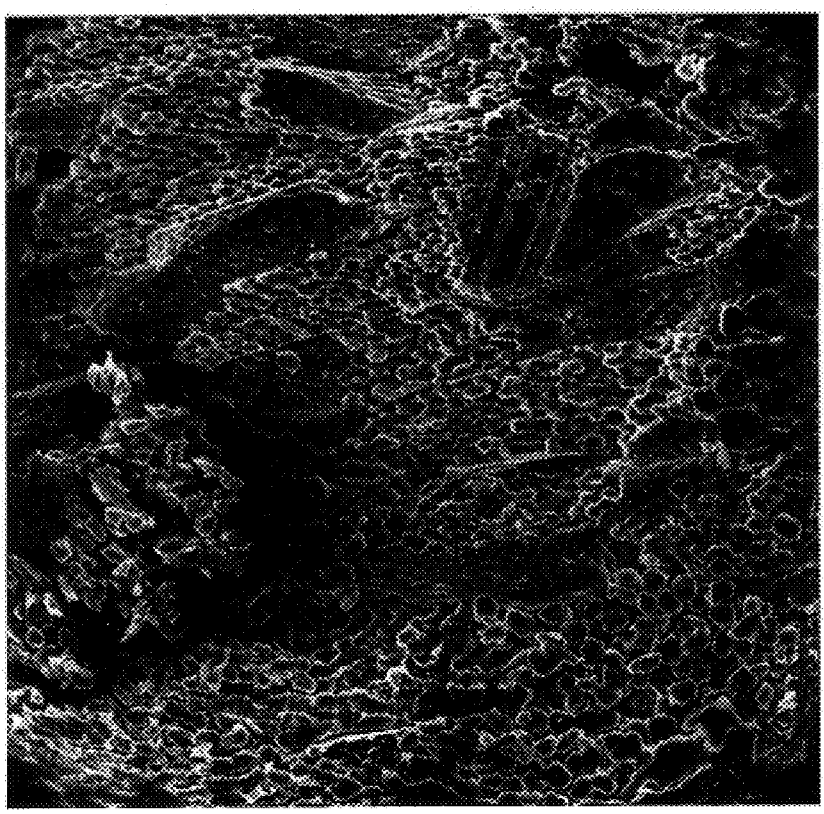
FIG. 9 is a scanning electron micrograph (SEM) illustrating the structure of a conventional swine feed pellet prepared using a standard pellet mill.
Figure 10:
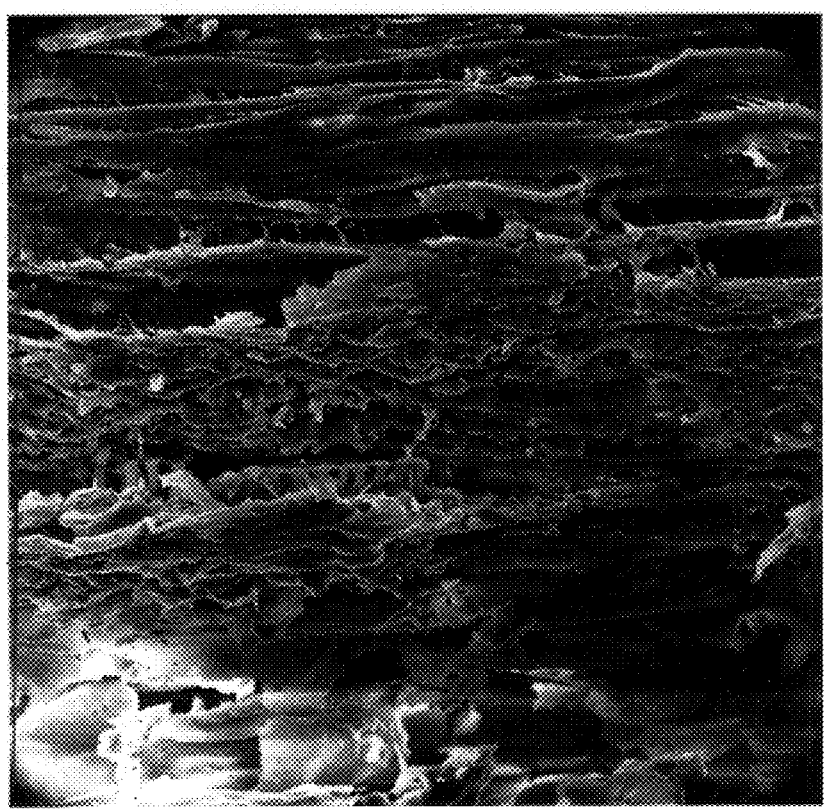
FIG. 10 is a scanning electron micrograph similar to that of FIG. 9 but illustrating the structure of a swine feed pellet in accordance with the invention.

Referring first to FIG. 9, the illustrated round particles are substantially intact (i.e., not substantially gelatinized) starch particles, with only a general flow pattern aligned with flow of pellet through the pellet mill die. In contrast, the FIG. 10 SEM demonstrates that products in accordance with the invention having few if any intact starch particles, with very pronounced flow pattern alignment. The FIG. 10 SEM also illustrates a significant laminar structure which is believed to impart significant strength to the pellets.

In the preferred practice of the present invention, as the ingredients pass through the preconditioner, the protein and starch fractions are transformed from a highly viscous, glassy state into or approaching a rubbery dough. However, as the starting ingredient in this condition enter the short length cooking extruder of the invention, the temperature thereof rises to a point near to or even slightly above the melt transition temperature and the viscosity of the protein and starch fractions is reduced. As the materials exit through the final die however, the desired laminar structure is obtained and as the temperature rapidly declines, the protein and starch fractions revert to a glassy state. At this point, the laminar structure is permanently retained in the final products. At the same time however, where dense products are desired conditions are controlled to limit any expansion of the product upon exiting the die. Generally, some degree of "die swell" is observed, but the overall expansion of the product upon extrusion is small. The percentage of such expansion is measured as the diameter (or largest cross-sectional dimension) of the product divided by the diameter (or largest cross-sectional dimension) of the die opening, times 100. The products of the invention typically have no more than about 30% expansion, more preferably up to about 20% expansion.

I claim:

1. A method of extrusion cooking an edible material comprising the steps of:

passing said edible material into the inlet of an elongated extruder having a barrel equipped with an endmost extrusion die and an internal, axially rotatable, flighted screw assembly within the barrel, said extruder having an L/D ratio of up to about 6; and rotating said screw assembly at a speed of at least about 500 rpm for advancing said material from said inlet along the length of said barrel and out said extrusion die for at least partial cooking of the edible material, the residence time of said material in said extruder barrel being from about 2–9 seconds.

2. The method of claim 1, said edible material including a nutrient selected from the group consisting of an amino acid, a vitamin and mixtures thereof, at least about 90% of said nutrient in said material remaining in a substantially nutritionally active, undegraded form after passage thereof through said extrusion die.

3. The method of claim 2, said extrudate having at least about 95% of said nutrient therein in a substantially nutritionally active, undegraded form.

4. The method of claim 2, said nutrient comprising lysine, valine, methionine, arginine, threonine, tryptophan, histadine, isoleucine, and phenylalamine.

5. The method of claim 4, said nutrient comprising a free amino acid.

6. The method of claim 4, said nutrient comprising a polypeptide.

7. The method of claim 2, said nutrient comprising vitamin A.

8. A method of extrusion cooking an edible material comprising the steps of:
passing said edible material into the inlet of an elongated extruder having a barrel, an internal, axially rotatable, flighted screw assembly within the barrel, and an endmost extrusion die having an inner face adjacent said screw assembly defining the outlet for the barrel; and
rotating said screw assembly at a speed of at least 500 rpm for advancing said material from said inlet along the length of said barrel and out said extrusion die for at least partial cooking of the edible material,
the pressure within said extruder barrel at a point spaced rearwardly from the inner face of said extrusion die axially along the length of said screw assembly a distance equaling 1.5 times the largest diameter D of the extruder barrel being essentially atmospheric, and the pressure within said extruder barrel immediately adjacent said inner face of said extrusion die being at least about 100 psi.

9. The method of claim 8, said pressure within said extruder barrel immediately adjacent said inner face of said extrusion die being at least about 300 psi.

10. The method of claim 8, the tip speed of said screw assembly being from about 400–1600 ft/min.

11. The method of claim 10, said tip speed being from about 700–900 ft/min.

12. A dense, hard, highly cooked animal feed product comprising an extruded, edible body including respective quantities of protein and starch, said body having a bulk density of at least about 28 lb/ft$^3$, the starch fraction of the body being at least about 60% gelatinized, said product having a pellet durability index of at least about 90, the product, upon submersion in 58° F. water for a period of four minutes, having a maximum resistance to crushing which is less than about 70% of the maximum resistance to crushing of the product prior to said water submersion.

13. The product of claim 12, said starch fraction being from about 65–85% gelatinized.

14. The product of claim 12, said pellet durability index being at least about 95.

15. The product of claim 12, the product, upon submersion in 58° F. water for a period of eight minutes, having a maximum resistance to crushing of up to about 40% of the maximum resistance to crushing on the product prior to water submersion.

16. The product of claim 12, said product being a swine feed.

17. The product of claim 12, said product having a moisture content of up to about 20% by weight immediately after extrusion thereof.

18. The product of claim 17, said moisture content being up to about 18% by weight.

19. The product of claim 12, said product exhibiting no more than about 30% expansion.

20. A dense, hard, highly cooked animal feed product comprising an extruded, edible body including respective quantities of protein and starch, said body having a bulk density of at least about 28 lb/ft$^3$, the starch fraction of the body being at least about 60% gelatinized, said product having a pellet durability index of at least about 90.

21. A dense, hard, highly cooked animal feed product comprising an extruded, edible body including respective quantities of protein and starch, said body having a bulk density of at least about 28 lb/ft$^3$, the starch fraction of the product being at least about 60% gelatinized, the product, upon submersion in 58° F. water for a period of four minutes, having a maximum resistance to crushing which is less than about 70% of the maximum resistance to crushing of the product prior to said water submersion.

22. A method of extrusion cooking an edible material comprising the steps of:
passing said edible material into the inlet of an elongated extruder having a barrel equipped with an endmost extrusion die and an internal, axially rotatable, flighted screw assembly within the barrel; and
rotating said screw assembly at a rotational speed of at least about 600 rpm for advancing said material from said inlet along the length of said barrel and out said extrusion die for at least partial cooking of the edible material,
the residence time of said material in said extruder barrel being from about 2–15 seconds.

23. The method of claim 22, said rotational speed being from about 600–1200 rpm.

24. The method of claim 22, said residence time being from about 2–6 seconds.

* * * * *